(12) United States Patent
Hobbs et al.

(10) Patent No.: US 6,964,195 B2
(45) Date of Patent: Nov. 15, 2005

(54) MICROMACHINED VIBRATORY GYROSCOPE AND METHOD WITH ELECTRONIC COUPLING

(75) Inventors: Larry P. Hobbs, Brentwood, CA (US); Feiyue Wang, Concord, CA (US)

(73) Assignee: BEI Technologies, Inc., San Francisco, CA (US)

( * ) Notice: Subject to any disclaimer, the term of this patent is extended or adjusted under 35 U.S.C. 154(b) by 0 days.

(21) Appl. No.: 10/769,625

(22) Filed: Jan. 30, 2004

(65) Prior Publication Data

US 2005/0166675 A1  Aug. 4, 2005

(51) Int. Cl.[7] ................................. G01P 9/04
(52) U.S. Cl. ................... 73/504.14; 73/504.12
(58) Field of Search ............... 73/504.14, 504.12, 73/504.02, 504.04, 504.03, 514.32, 514.29, 73/514.38, 514.37, 862.59

(56) References Cited

U.S. PATENT DOCUMENTS

| | | | |
|---|---|---|---|
| 5,635,638 A | 6/1997 | Geen | |
| 5,747,961 A * | 5/1998 | Ward et al. | 318/646 |
| 5,780,948 A | 7/1998 | Lee et al. | |
| 5,992,233 A | 11/1999 | Clark | |
| 6,189,381 B1 | 2/2001 | Huang et al. | |
| 6,230,563 B1 | 5/2001 | Clark et al. | |
| 6,250,156 B1 | 6/2001 | Seshia et al. | |
| 6,257,059 B1 | 7/2001 | Weinberg et al. | |
| 6,327,907 B1 * | 12/2001 | Park | 73/504.12 |
| 6,722,197 B2 * | 4/2004 | Knowles et al. | 73/504.12 |

OTHER PUBLICATIONS

Geiger et al., "New Designs of Micromachined Vibrating Rate Gyroscopes with Decoupled Oscillation Modes", Sensors and Actuators A; Physical, Apr. 1998, pp. 118-124, vol. 66.

* cited by examiner

*Primary Examiner*—Helen Kwok
(74) *Attorney, Agent, or Firm*—Edward S. Wright (57) ABSTRACT

Micromachined vibratory gyroscope and method in which the vibrating masses are coupled electronically, e.g. by electronically adjusting the resonance frequency of one or more of the masses so that all of the masses have the same resonance frequency.

33 Claims, 8 Drawing Sheets

FIG_1
*(PRIOR ART)*

FIG_2
*(PRIOR ART)*

FIG_3

FIG_4

FIG_5

FIG_6

FIG_7

FIG_8

FIG_9

MICROMACHINED VIBRATORY GYROSCOPE AND METHOD WITH ELECTRONIC COUPLING

BACKGROUND OF THE INVENTION

1. Field of Invention

This invention pertains generally to inertial sensors and the like and, more particularly to a micromachined, vibratory gyroscope and method.

2. Related Art

Vibratory gyroscopes operate by detecting Coriolis-induced motion induced by rotation of the gyroscope about a sensitive axis. When a mass is driven to oscillate along a given axis and is rotated about an axis perpendicular to the axis of vibration, a Coriolis force is generated and applied to the mass along a response axis perpendicular to the axes of vibration and rotation. The rate of rotation is measured by detecting the change in motion of the mass along the response axis caused by the Coriolis force.

Coriolis-induced forces on the vibrating masses are in phase with the velocity of the masses since the Coriolis force is proportional to the velocity. Any undesired coupling of the motion along the primary or driven axis of vibration to the response axis will give rise to a spurious motion of the masses along the response axis. This undesired coupling is generally in phase with the displacement of the masses, rather than velocity, and is often referred to as a quadrature error.

One way to sense a change in motion of a mass due to a Coriolis force is capacitive detection, which typically involves a fixed electrode and a movable electrode. In such devices, it is important to minimize motion of the movable electrode in the absence of applied rotation, i.e., any motion of the mass along the response axis which is not due to a Coriolis force. Otherwise, an undesired quadrature signal will be present, having the same frequency as the rate signal but phase shifted by 90 degrees. This quadrature signal is superimposed on the desired output signal. Although the quadrature signal can be partially rejected electronically, e.g. by the use of phase-sensitive demodulation, that tends to degrade the performance of the gyroscope.

Another source of error in a vibratory gyroscope is sensitivity to linear accelerations which displace the masses thus produce undesired outputs.

When a gyroscope is mounted on a support for a given application, any unbalanced momentum of the vibrating masses will cause part of the driving energy to be injected into the support and then potentially be coupled back to the device. Energy fed back in that manner can cause bias errors and makes the performance of the device sensitive to the mounting conditions. Using two vibratory members with equal masses and moving with equal and opposite displacements eliminates this momentum imbalance and significantly improves sensor performance.

In micromachined vibratory gyroscopes heretofore provided, the vibrating masses are generally coupled together mechanically, with a spring or equivalent structure linking the two masses and creates a force between them proportional to their relative displacement. Heretofore, it has generally been thought that such coupling is required in order to assure that the masses will oscillate at a common frequency of resonance.

Uncoupled masses generally have different resonant frequencies, which would not be conducive to a practical sensor. Using a single source of drive excitation, a system with two resonant frequencies would tend to be unstable or to operate at the resonant frequencies of one or the other of the masses.

When the masses are sufficiently coupled, the two masses will no longer oscillate with separate frequencies, but will act as a modal system. One mode of this system will generally involve a substantially differential oscillation in which the masses move with roughly equal and opposite displacements. In the event that the two masses or their supporting spring structures are not symmetrical, the two masses will undergo unequal displacements. That is an undesirable condition which couples the gyro to its support structure, making it sensitive to changes in boundary conditions.

Practical rate sensors are subject to variations due to fabrication tolerances which result in asymmetries in mass and stiffness. While the masses may be coupled, the differential mode of oscillation will not be completely symmetrical.

Another disadvantage of coupling mechanisms used for vibratory rate sensors is that many of them employ folded beam designs that increase the required substrate area and size of the device.

OBJECTS AND SUMMARY OF THE INVENTION

It is, in general, an object of the invention to provide a new and improved micromachined vibratory gyroscope and method.

Another object of the invention is to provide a gyroscope and method of the above character that do not require mechanical coupling between the vibrating masses.

These and other objects are achieved in accordance with the invention by providing a micromachined vibratory gyroscope and method in which the vibrating masses are coupled electronically, e.g. by electronically adjusting the resonance frequency of one or more of the masses so that all of the masses have the same resonance frequency.

DETAILED DESCRIPTION

Figure 1:
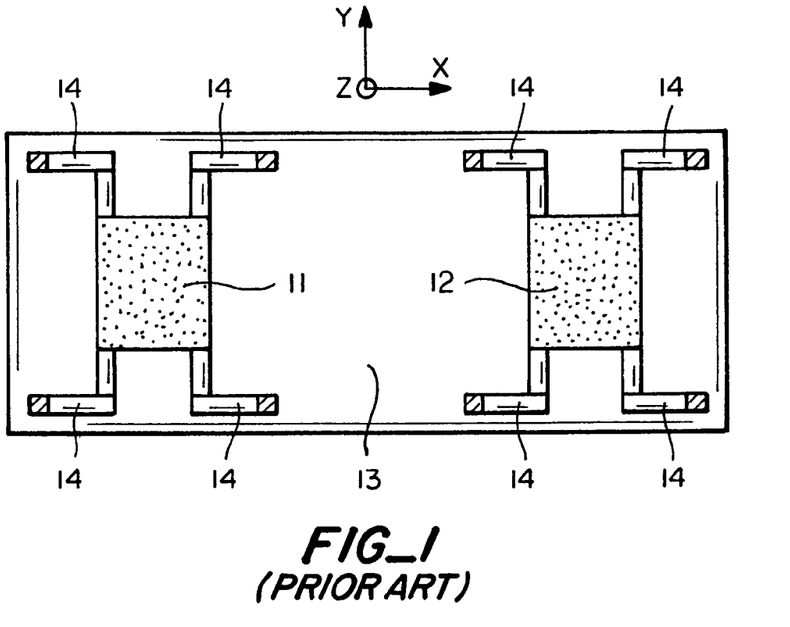
FIG. 1 is a top plan view, somewhat schematic, of a prior art micromachined vibratory gyroscope having two uncoupled masses.

FIG. 1 illustrates a typical micromachined sensor of the prior art in which masses 11, 12 are suspended above a substrate 13 by flexible arms 14 which are anchored at their outer ends to the substrate. The two masses are totally uncoupled and free to move independently of each other, with different resonant frequencies.

Figure 2:
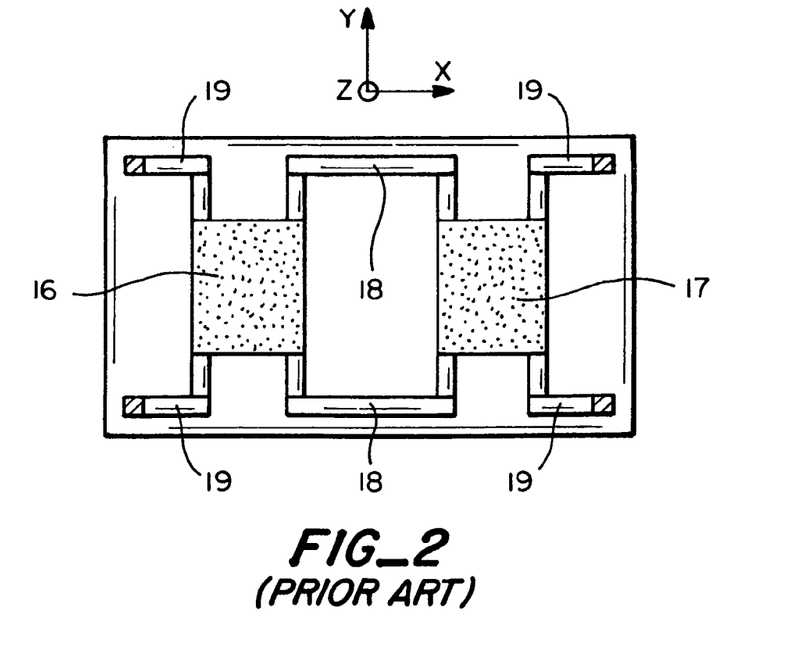
FIG. 2 is a top plan view, somewhat schematic, of a prior art micromachined vibratory gyroscope having mechanically coupled masses.

FIG. 2 illustrates a prior art device in which masses 16, 17 are coupled together by flexible links 18 and suspended by flexible arms 19. When one of the masses is displaced along the x-axis, a force is transmitted to the other by the coupling links. The natural frequency of resonance of the two modes for displacement along the x-axis involves a pair of coupled modes, one for differential (out-of-phase) motion of the two masses and the other for common mode (in-phase) motion. In the absence of symmetry between the two masses or their supports, the differential mode of resonance would no longer be perfect. Instead, it would also include a common mode component of motion. An unbalanced differential mode of operation tends to degrade the performance of a gyroscope by increasing coupling of motion to the outside environment via the mounting points.

Figure 3:
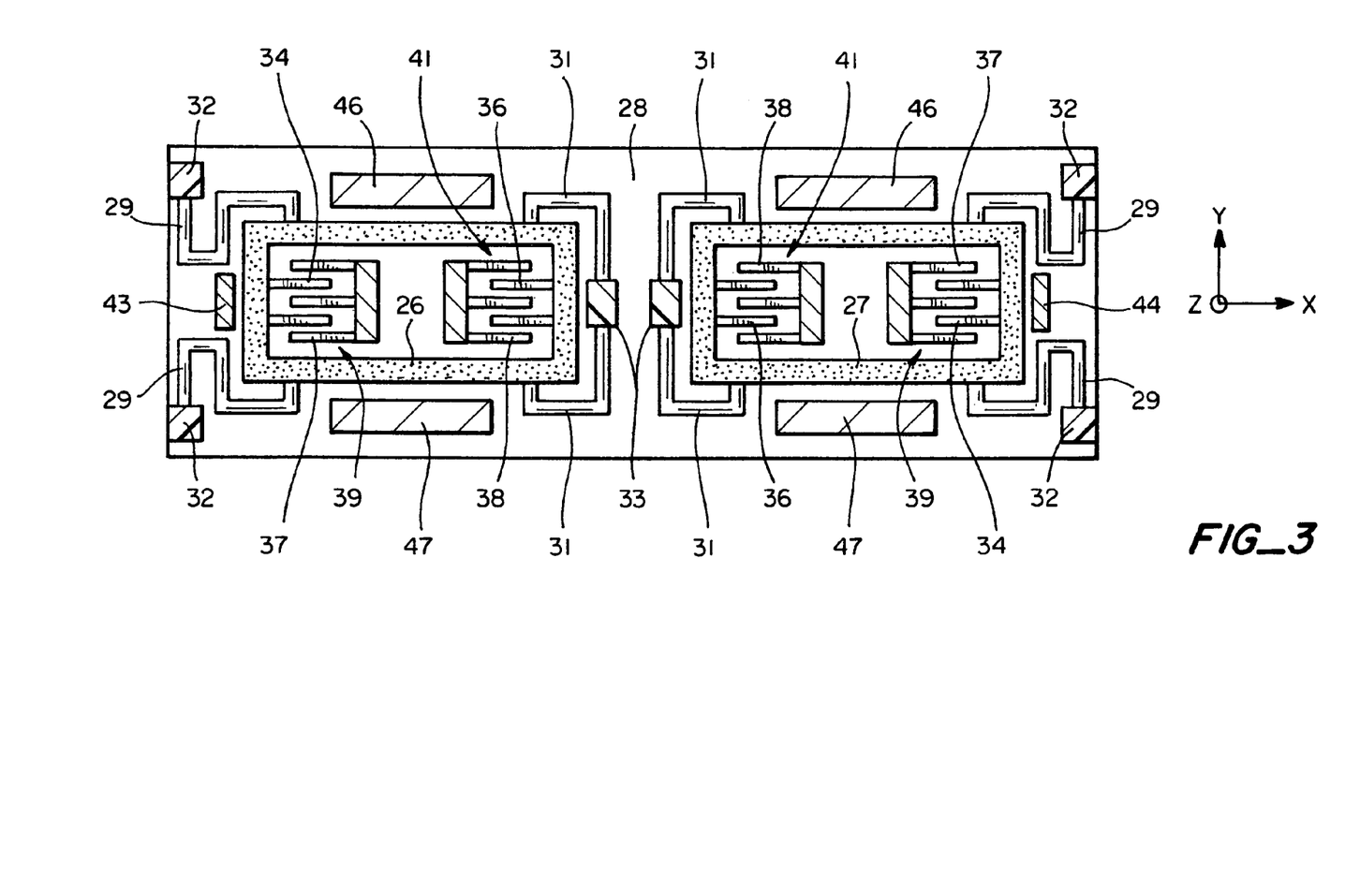
FIGS. 3–6 are top plan views, somewhat schematic, of different embodiments of a micromachined vibratory gyroscope with electronic coupling in accordance with the invention.

In the embodiment of FIG. 3, the rate sensor or gyro has a pair of masses 26, 27 which are spaced apart along the x-axis and suspended above a substrate 28 by flexible arms 29, 31 extending from anchors 32, 33 affixed to the substrate. Each of the arms has sections extending in both the x and the y directions, whereby the two masses are decoupled with respect to motion along both the x- and y-axes. Since the anchors are fixed, there is no coupling of mechanical forces between the masses, and the two masses are free to resonate at their respective natural frequencies as determined by the masses themselves and the stiffness of the support systems. Although inner anchors 33 are shown as being separate, they could be joined together or combined into one larger anchor without significantly increasing the coupling between the two masses.

The masses are in the form of rectangular frames with comb fingers 34, 36 extending in the x direction from opposite ends of the frames. Those fingers are interleaved with stationary comb fingers 37, 38 which are affixed to the substrate to form capacitors 39, 41. Drive voltages are applied to one of the capacitors in each pair (e.g., capacitors 39) to vibrate the masses in the x-direction, with the other pair of capacitors (e.g., capacitors 41) being used to sense motion of the masses along the x-axis.

Electrodes 43, 44 are positioned adjacent to the outer ends of masses 26, 27 to form parallel plate capacitors with the masses. Offset voltages are applied to one or both of those capacitors to create electrostatic forces that vary with the displacement of the masses and thereby control the resonance frequencies of the mass-spring systems. In the presently preferred embodiment, the offset voltages are applied with a polarity such that the electrostatic forces are attractive forces which are equivalent to springs of negative value. This equivalent spring reduces the total stiffness of the support system and, hence, the natural frequency of resonance for the mass.

Applying the same or equal offset voltages to both electrodes will tend to reduce the resonance frequency of both spring-mass systems, while applying an offset voltage to only one will reduce the frequency of the adjacent spring-mass system only. In this way, the spring-mass system with the higher natural frequency of resonance can be adjusted in frequency until it resonates at the same frequency as the other spring-mass system, which is important for proper functioning of the sensor. Both masses can then be tuned to match the drive mode oscillation along the x-axis to the sense mode displacement along the y-axis, if necessary. Alternatively, the sense mode can be adjusted by similar means to match the tuned drive masses, if desired.

In one method of operation, the two masses are driven in a "master-slave" relationship in which the natural frequency of one of the spring-mass systems is used as a reference frequency and is not adjusted, while the other is adjusted electronically to equal the reference. The frequency spring-mass system having the lower natural frequency is designated the "master", and the one with the higher frequency is the "slave". The "slave" spring-mass system is tuned by adjusting the offset voltage on either electrode 43 or electrode 44 until the oscillation of the "slaved" mass is roughly at its maximum and in the correct phase. During the adjustment, the amplitude and phase of the displacement are sensed with capacitors 41.

Alternatively, both resonant systems can have equal weighting in the frequency adjustment, and both can be adjusted, with one increasing in frequency and the other decreasing. That is done by decreasing the biasing voltage applied to one of the frequency adjustment electrodes 43, 44 and increasing the other.

Unlike coupled mass gyros, the two masses do not have separate frequencies of resonance for differential and common mode oscillations along the x-axis. The selection of a purely differential motion for the oscillation is done electronically by adjusting the relative amplitude and phase of the drive signals applied to the comb fingers or electrodes of capacitors 39.

In the rate sensor of FIG. 3, the two masses will oscillate in an out-of-phase manner along the y-axis in response to Coriolis forces produced by rotation of the sensor about the z- or input axis. This motion is detected as a change in capacitance between the masses and electrodes 46, 47 which are affixed to the substrate near the masses. Because the masses are uncoupled, the natural frequencies of resonance of the two masses in the y direction are generally not equal. Bias voltages can be applied to electrodes 46, 47 or to other electrodes (not shown) to adjust the resonance frequencies of the sense mode to be equal or to have any other values that may be desired.

Alternatively, rather than applying sense mode tuning voltages to separate electrodes such as parallel plate capacitive elements 46, 47, the y-axis resonant frequencies can also be tuned by adjustment of the bias voltages applied to drive capacitors 39.

Figure 4:
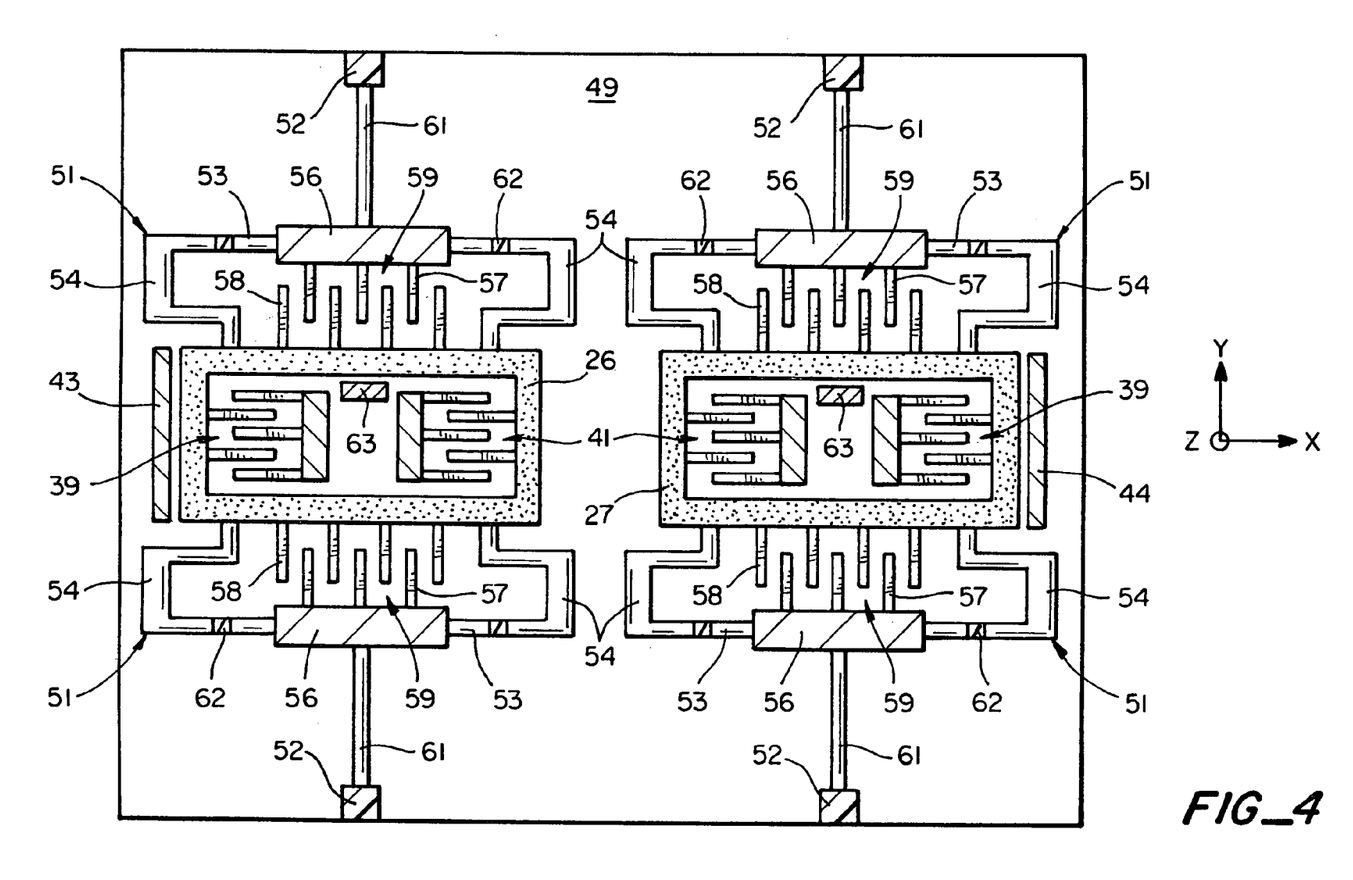

The embodiment of FIG. 4 also has two proof masses 26, 27 with capacitors 39, 41 for driving and sensing motion of the masses. The two masses are suspended above a substrate 49 by flexible arm structures 51 which are suspended from anchors 52 affixed to the substrate. Each of the arm structures includes a pair of axially aligned flexible beams 53 which extend in the x direction and are spaced from the mass, with the outer ends of the beams being connected to the mass by arms 54 which are relatively rigid in the x direction and flexible in the y direction. The inner ends of beams 53 are affixed to relatively rigid comb structures 56 which have fingers 57 that extend in the y direction and are interleaved with comb fingers 58 which extend outwardly from the masses to form capacitors 59.

Each of the arm structures also includes a flexible beam 61 which extends in the y direction between anchor 52 and the midpoint of comb structure 56.

Masses 26, 27 are thus decoupled both in the drive mode and in the sense mode and are free to vibrate or oscillate in the x direction and to move in the y direction in response to Coriolis forces produced by rotation of the sensor about the z- or input axis. That motion causes beams 53 and/or support arms 54 to deflect in the y direction, producing a change in the capacitance between comb fingers 57 and 58. The two masses oscillate in an out-of-phase manner in the y direction, and the motion is detected by monitoring the capacitance between the comb fingers.

Because the masses are completely separated, mechanical forces are not coupled between them, and the two masses are free to resonate at their respective natural frequencies as determined by the mass and the stiffness of their support systems.

Support beams 61 are flexible in the x direction and rigid in the y direction. Therefore, outer comb fingers 57 are free to move in the x direction, but not in the y direction. Hence, the inner and outer comb fingers move together in the x direction, and the inner fingers move relative to the outer fingers in the y direction.

As in the embodiment of FIG. 3, electrodes 43, 44 are positioned adjacent to the outer ends of masses 26, 27 to form parallel plate capacitors to which offset voltages can be applied to control the resonance frequencies of the mass-spring systems. Here again, it is important to have both spring-mass systems resonant at the same frequency for proper functioning of the sensor.

This embodiment can also be operated in the "master-slave" fashion discussed above in connection with the embodiment of FIG. 3, with the natural frequency of the spring-mass system with the higher natural frequency being adjusted electronically to match the other. Here again, the offset voltage applied to electrode 43 or electrode 44 is adjusted to make the oscillation of the "slaved" mass roughly a maximum and in the correct phase. The relative amplitude and phase of the drive signals applied to electrodes 39 can be adjusted to make the oscillation purely differential.

Alternatively, both resonant systems can be adjusted by decreasing the biasing voltage applied to one of the frequency adjustment electrodes 43, 44 and increasing the other.

In the embodiment of FIG. 4, the two masses are once again able to move along the y-axis in response to Coriolis forces produced by rotation about the z-axis. That causes beams 53 and/or flexible support elements 54 to deflect, and the two masses oscillate in an out-of-phase manner along the y-axis, with a resulting change in capacitance between comb fingers 57, 58. Not being anchored, the outer comb fingers 57 move with the inner fingers 58 for the drive motion along the x-axis. However, movement of the outer fingers in the y direction is prevented by beams 61 which are rigid in the y direction while being flexible in the x direction.

The common motion of the inner and outer comb fingers in the x-axis oscillation minimizes the leakage of the drive signal into the output of the device. This error signal, often called the quadrature signal, is in phase with the drive displacement, which is 90 degrees out of phase with the velocity and, hence, the Coriolis-induced angular rate signal.

The inner and outer comb fingers are isolated electrically from each other by insulators 62 in beams 53, and a bias voltage applied between the inner and outer fingers to scale the sense output and to adjust the frequency of resonance along the x, or drive, axis.

With the masses uncoupled, the natural frequencies of resonance in the y direction are generally not equal, and bias voltages are applied between the masses and electrodes 63 which are mounted on the substrate near the inner edges of the masses. With those voltages, the resonance frequencies of the sense mode can be adjusted to be equal or to have any other values that may be desired.

Figure 5:
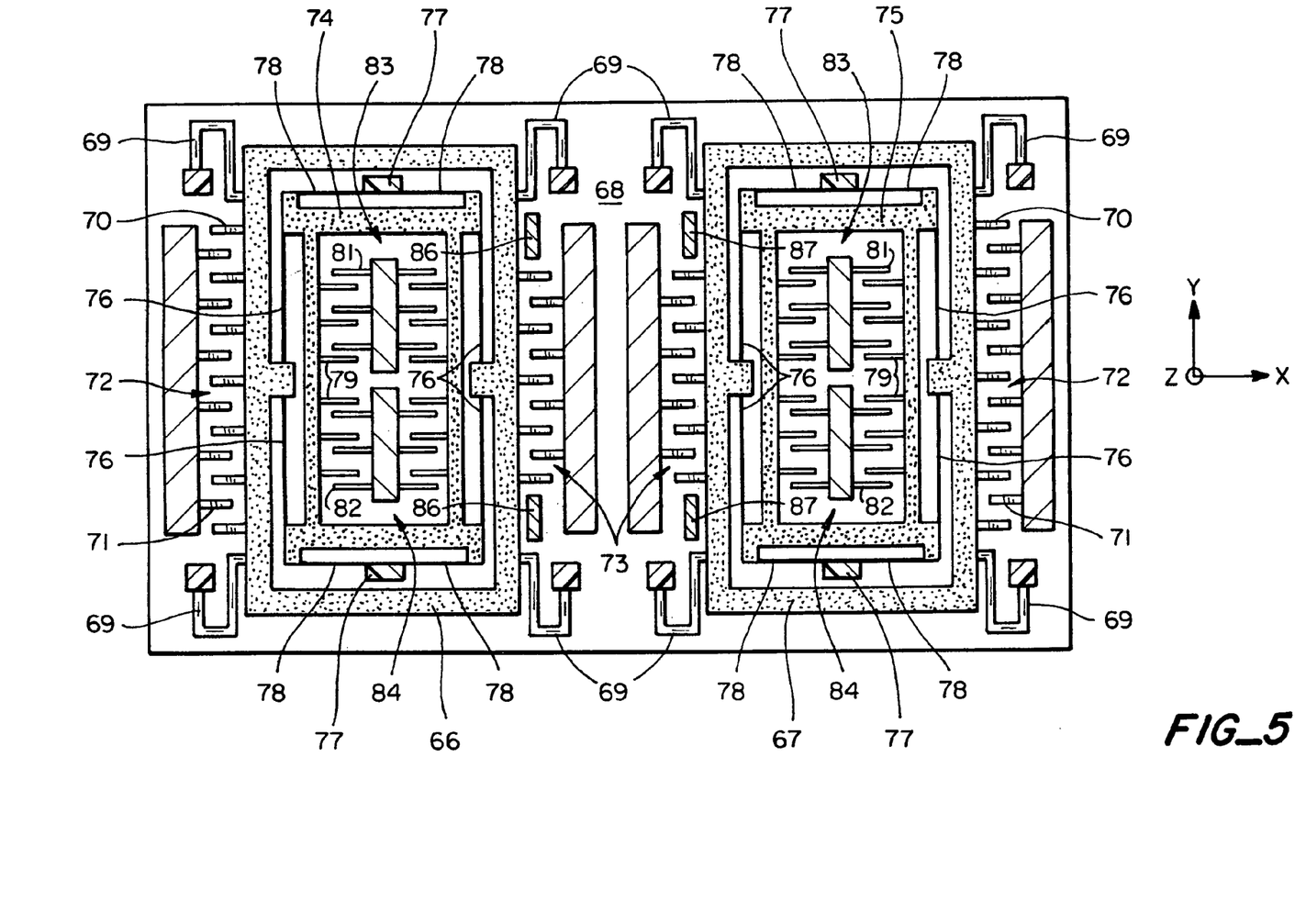

FIG. 5 illustrates an embodiment having separate drive and sensing masses, with both the drive mode and the sense mode are once again being decoupled. In this embodiment, drive masses 66, 67 are suspended above a substrate 68 by folded arm structures 69 which are anchored to the substrate at their outer ends and are flexible in both the x and y directions, whereby the masses are decoupled with respect to motion along both the x- and y-axes. Because the masses are completely separate, mechanical forces are not coupled between them, and the two masses are free to resonate at their respective natural frequencies as determined by the masses themselves and the stiffness of their support systems.

Comb fingers 70 extend outwardly in the x direction from the sides of drive masses 66, 67 and are interleaved with comb fingers 71 which are mounted in a fixed position on the substrate for excitation and detection of drive motion along the x-axis. A drive voltage signal is typically applied to one pair of the comb fingers (e.g., fingers 72) associated with each of the mass structures, and the other (fingers 73) is used to detect the motion of the masses along the x-axis.

Sensing masses 74, 75 are mounted within and suspended from the drive masses by beams 76 which are flexible in the x direction. They are also suspended from anchors 77 affixed to the substrate by beams 78 which are flexible in the y direction.

Comb fingers 79 extend inwardly in the x direction from the sides of sensing masses 74, 75 and are interleaved with two sets of comb fingers 81, 82 which are mounted in a fixed position on the substrate to form two capacitors 83, 84 for detecting motion of the each of sensing masses in the y direction.

The sense mode is 'quiescent' in that the sensing masses 74, 75 and sensing capacitors 83, 84 do not move as part of the driven mode of motion (i.e., with the drive masses) along the x-axis. The sensing masses and the comb fingers 79 affixed to them are, however, free to move along the y-axis in response to rotation-induced Coriolis acceleration.

Electrodes 86, 87 are mounted on the substrate adjacent to the inner edges of masses 66, 67 to form parallel plate capacitors to which offset voltages can be applied to control the resonance frequencies of the mass-spring systems. As in the previous embodiments, it is important to have both spring-mass systems resonant at the same frequency for proper functioning of the sensor.

This embodiment can also be operated in the "master-slave" fashion discussed above in connection with the embodiments of FIGS. 3 and 4, with the natural frequency of the spring-mass system with the higher natural frequency being adjusted electronically to match the other. The offset or bias voltage on one or more of the frequency adjustment electrode or drive comb finger pairs 71, 72 is adjusted to make the oscillation of the "slaved" mass roughly a maximum and in the correct phase. The relative amplitude and phase of the drive signals applied to those electrodes can be adjusted to make the oscillation purely differential.

Alternatively, both resonant systems can be adjusted by decreasing the biasing voltage applied to the frequency adjustment electrodes for one of the systems and increasing the other.

The beams 76 by which sensing masses 74, 75 are suspended from drive masses 66, 67 constrain the sensing masses for movement in concert with the drive masses along the y-axis in response to Coriolis forces produced by rotation of the sensor about the z-axis. That motion causes support arms 78 to deflect in the y direction and changes the capacitance between comb fingers 79, 81. The two mass systems oscillate in an out-of-phase manner in the y direction, the sensing is differential in that the polarities of the changes in capacitance are opposite for the two capacitors 83, 84 associated with either of the masses.

The output signal for each of the two sensing masses is obtained by taking the difference between the changes in the capacitance of the two capacitors associated with that mass. Because the drive motions of masses 66, 67 are nominally out of phase with each other, the rotation rate signals for the two sensing masses will also be out of phase, and the total signal due to applied rotation is obtained by subtracting the output signal for one of the sensing masses from the output signal for the other. Differencing the outputs for the two masses in this manner is advantageous in rejecting common-mode signals arising from acceleration inputs and in cancelling the effects of parasitic capacitance.

While allowing motion of sensing masses 74, 75 along the y-axis, beams 78 prevent motion of those masses along the x-axis and make the sensing masses quiescent in the drive mode. That does not prevent drive masses 66, 67 from moving along the x-axis because the beams which interconnect the drive masses and the sensing masses (beams 76) are relatively flexible in the x direction. As noted above, those beams are relatively stiff in the y direction, and they couple the Coriolis acceleration experienced by the drive masses to the quiescent sensing masses. With the sensing masses quiescent, leakage of the driven oscillation signal into the output of the device (quadrature error) is minimized.

Because the masses are uncoupled, the natural frequencies of resonance of the two mass systems in the y direction generally are not equal. However, bias voltages can be applied to electrodes 79, 81 to adjust the resonance frequencies of the sense mode to be equal or to have other desired values.

Although the invention has thus far been disclosed only in connection with rate sensors or gyros having only two masses, an array containing a larger number can be used, if desired. The resonant frequencies of such masses can be tuned either to match that of the lowest frequency spring-mass system in the array or to a another desired frequency. The use of electronic coupling to make all of the masses in the array oscillate at the same frequency effectively solves the problem of fabrication tolerances which would otherwise make such an array impractical.

Figure 6:
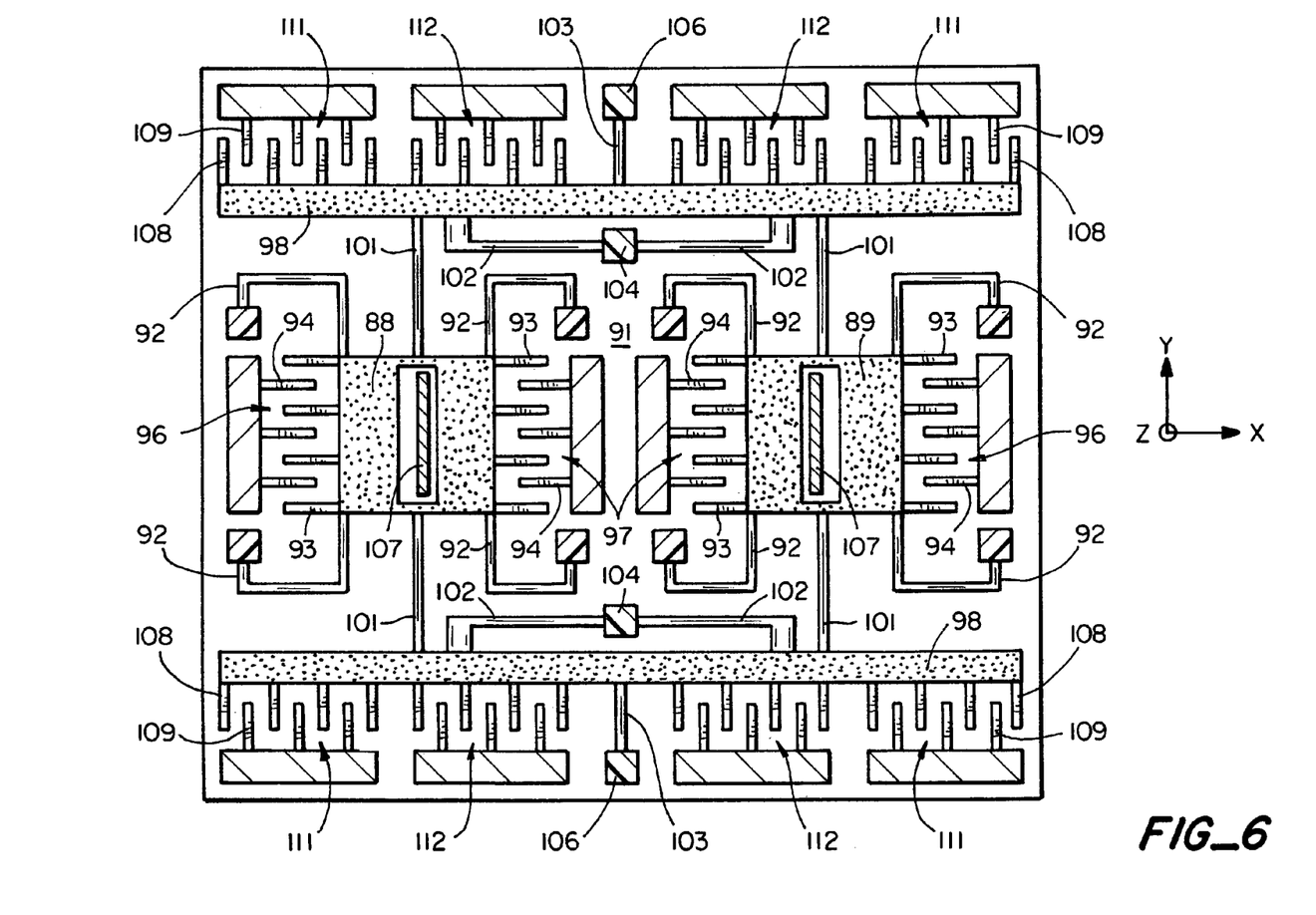

In the embodiments of FIGS. 3–5, both the drive mode and the sense mode of the spring-mass systems are uncoupled. FIG. 6 illustrates an embodiment in which the drive mode motion of the two masses along the x-axis is uncoupled but the sense mode motion along the y-axis is coupled.

In the embodiment of FIG. 6, masses 88, 89 are suspended above a substrate 91 by arms 92 which are anchored to the substrate and flexible in both the x and y directions. Comb fingers or electrodes 93 extend in the x direction from the outer sides of the masses and are interleaved with stationary comb fingers or electrodes 94 to form drive capacitors 96 and sensing capacitors 97. The two masses are driven to oscillate in an out-of-phase manner along the x-axis by drive signals applied to the drive capacitors.

Pickoff beams 98 extend in the x direction near opposite edges of the substrate and are connected to the two masses by flexible links 101 which extend in the y direction. The pickoff beams are also supported above the substrate by beams 102, 103 which extend in the x and y directions, respectively, and are attached to anchors 104, 106 affixed to the substrate.

Beams 102, 103 prevent translation of pickoff beams 98 along either the x-axis or the y-axis, while allowing them to rotate about the z-axis. Such rotation occurs when one mass moves in a positive y direction and the other moves in a negative y direction in response to the Coriolis force produced by rotation of the sensor about the z-axis. Since rotation of the pickoff beams requires movement of both masses in the y direction, the two masses are coupled together in the sense mode.

Having the pickoff beams constrained against translation in the x and y directions minimizes the sensitivity of the rate sensor or gyro to acceleration along the x- and y-axes.

Masses 88, 89 are free to oscillate along the x-axis at their respective natural frequencies, and frequency adjustment electrodes 107 are affixed to the substrate within openings in the two masses. Offset or biasing voltages can be applied to those electrodes to tune the resonant frequencies of the two masses, as desired, in the manner discussed above in connection with the other embodiments.

Comb fingers 108 extend in the y direction from the pickoff beams and are interleaved between eight sets of stationary fingers 109 which are anchored to the substrate to form four variable capacitors 111 which are used for output detection and four, designated by reference numeral 112, which are utilized in the application of a feedback signal for closed-loop force-feedback operation.

Figure 7:
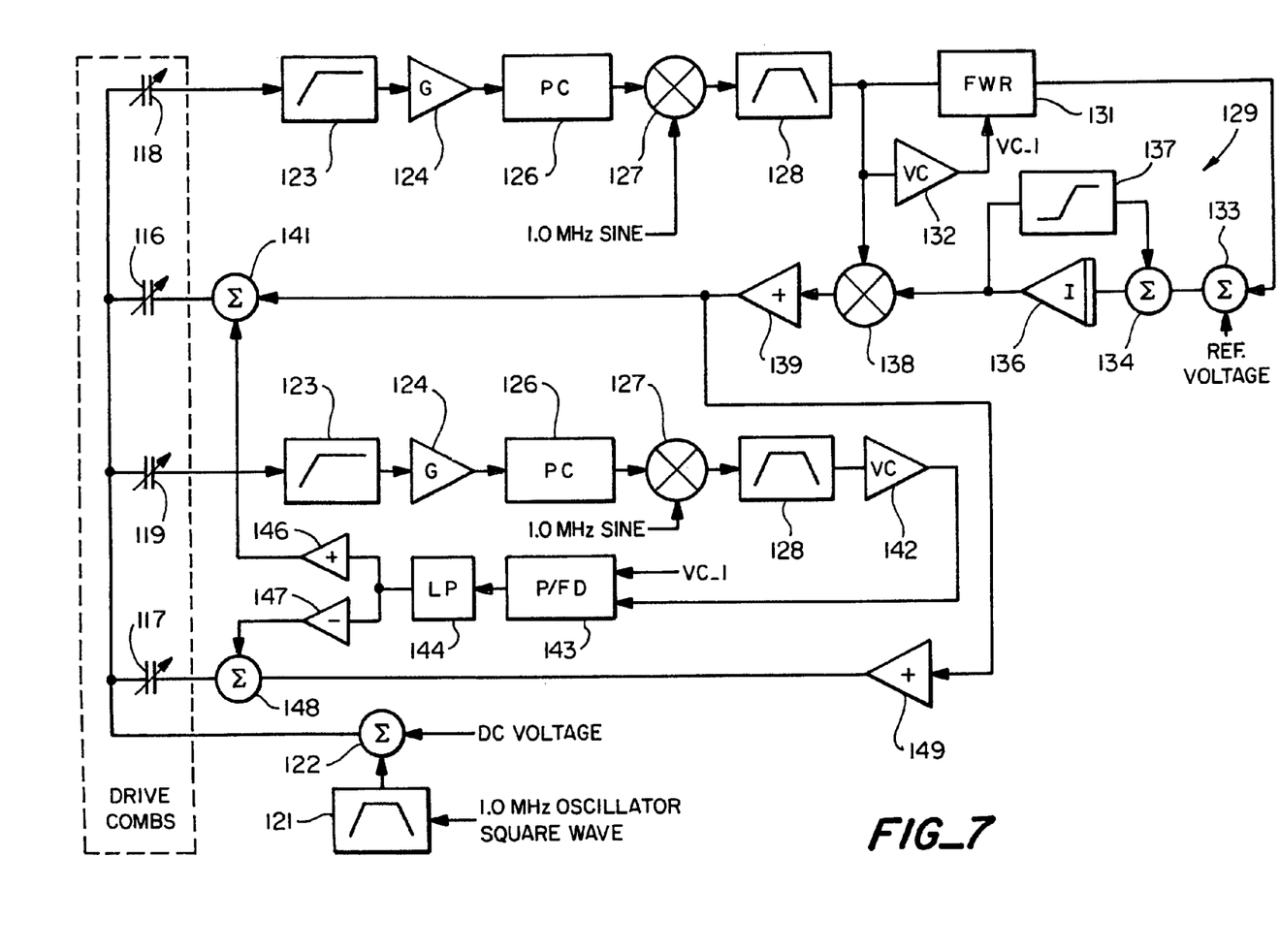
FIGS. 7–9 are block diagrams of circuits for providing electronic coupling between the vibrating masses of a micromachined vibratory gyroscope in accordance with the invention.
Figure 8:
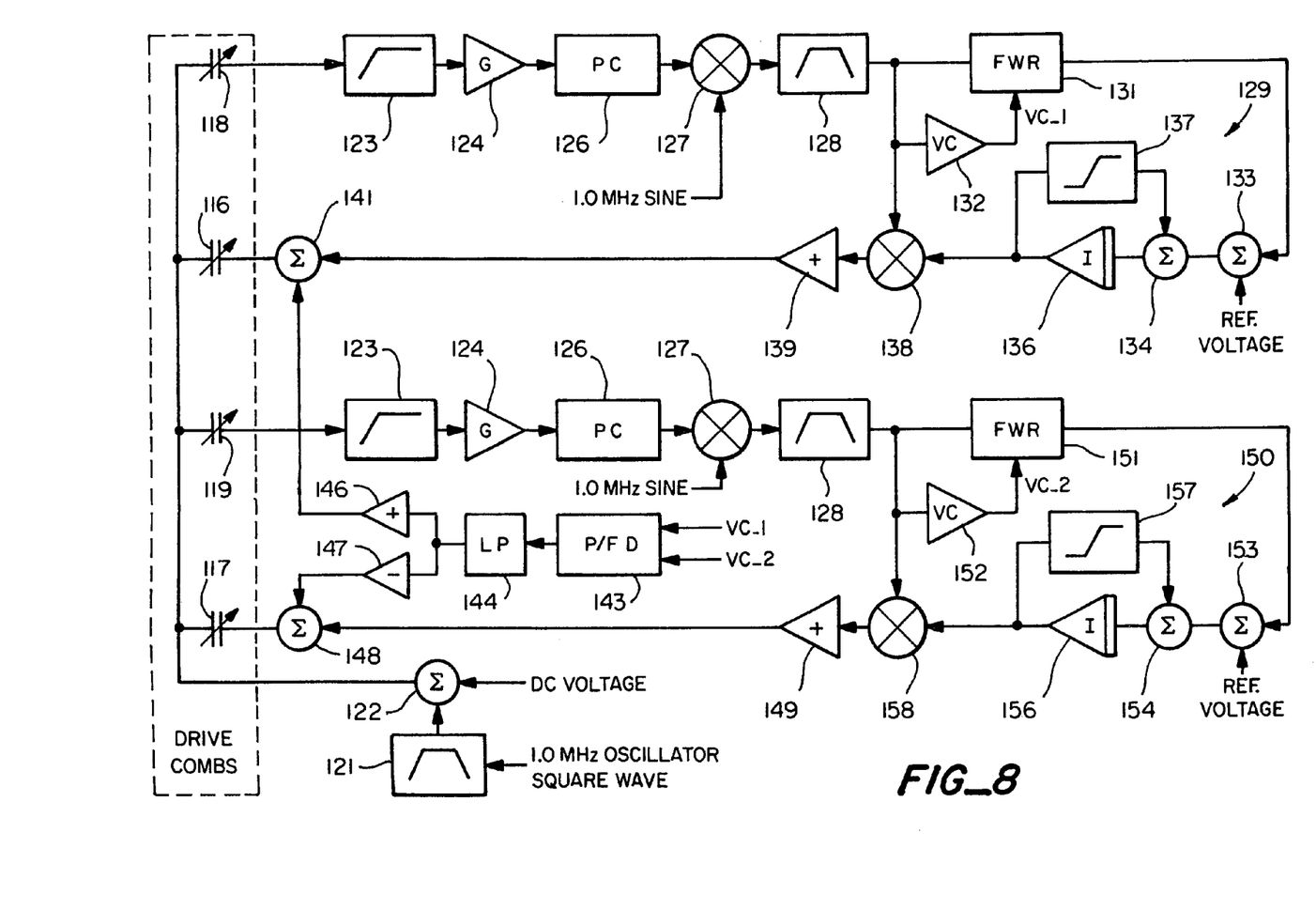
Figure 9:
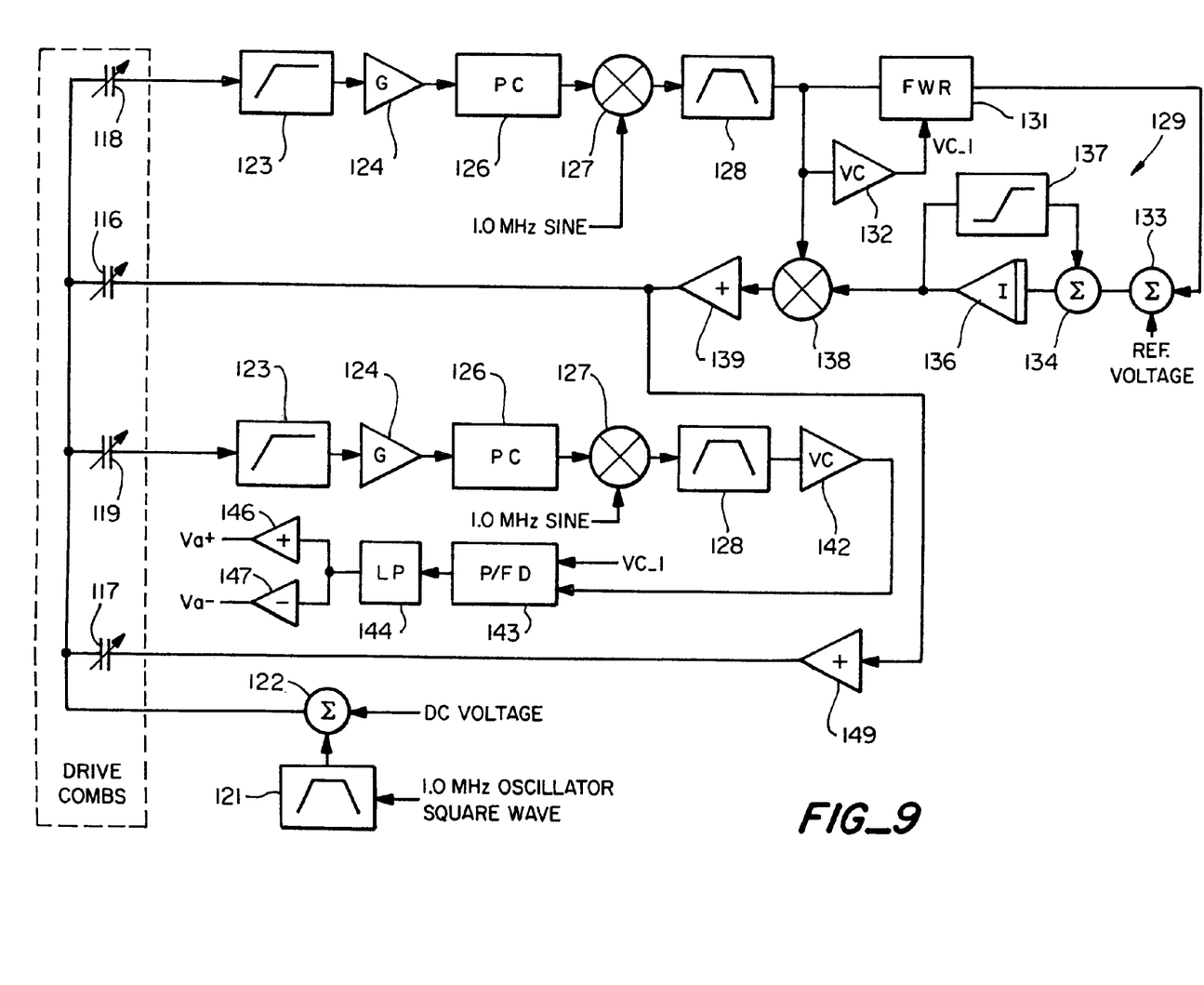

Circuits for driving the electronically coupled masses in the embodiments of FIGS. 3–6 are shown in FIGS. 7–9. Any of these circuits can be used with any of those embodiments.

In the embodiment of FIG. 7, the comb finger structures are shown schematically as variable capacitors 116–119, with capacitors 116, 117 corresponding to the drive fingers 39, 72, 96 in the embodiments of FIGS. 3–6, and capacitors 118, 119 corresponding to the pickup fingers 41, 73, 97 in the respective embodiments.

In order to improve the pickup signal-to-noise ratio, a tracer signal is applied to the pickup and drive capacitors. The tracer signal is derived from a square wave signal, which is converted to a sine wave by a band pass filter 121, then combined with a DC voltage in a summing junction 122 and applied to structural or fixed fingers of the comb structures. This provides an improvement of approximately 100:1 in the signal-to-noise ratio.

The tracer signal can have any frequency in the range of several hundred KHz to several MHz, and in the embodiment of FIG. 7, it is shown nominally as a 1 MHz signal. The amplitude of the tracer signal is controlled in order to reduce scale factor errors in other portions of the circuit.

Signals from pickup comb 118 are passed through a transimpedance amplifier 123 and an additional stage of gain 124 to a phase compensation circuit 126 to provide a signal which corresponds to the amplitude and phase of the drive motion along the x-axis. That signal is then demodulated with the tracer signal in a mixer or demodulator 127 and passed through a bandpass filter 128. The passband of the filter is centered roughly at the resonance frequency of the masses (typically 5–20 KHz), and the filter removes the higher-order terms of the tracer signal (e.g., the 1 MHz harmonics) to recover the mass resonance frequency signal. The bandpass filter also provides some additional gain for that signal.

The demodulated and filtered drive amplitude signal is passed through an automatic gain control (AGC) loop 129 which, in this embodiment, is illustrated as having a full-wave rectifier 131 to which the demodulated and filtered signal is applied. That signal is also applied to a voltage comparator 132 which provides a square wave reference signal VC_1 that is applied to the reference input of rectifier 131.

The rectified signal is combined with a reference voltage at summing junction 133. The signal from that junction is applied to another summing junction 134, the output of which is connected to the input of an integrator 136. The output of the integrator is fed back to the input of the integrator through a phase lead-lag network 137 and stabilizes at a fixed DC voltage once the output of the full-wave rectifier and the reference voltage applied to summing junction 133 sum to zero. Thus, the amplitude of the drive signal is maintained a predetermined level.

The output signal from integrator 136 is modulated back to the resonance frequency of the mass-spring system associated with drive comb 116 and pickup comb 118 by a mixer 138, using the signal from bandpass filter 128 as a reference, then applied to drive comb 116 through an amplifier 139 and a summing junction 141.

The portion of the circuit for providing the drive signal for the other spring-mass system is similar to the first except it does not have an AGC loop. Instead, the output from the bandpass filter 128 in this portion of the circuit is applied to voltage comparator 142, and the output of that comparator is applied to a phase/frequency detector circuit 143, to which reference signal VC_1 from voltage comparator 132 is also applied.

The output signal from the phase/frequency detector is passed through a lowpass filter 144 to produce a DC voltage which is proportional to the frequency and/or phase difference between the two input signals from pickup combs 118, 119. This DC signal is applied to the inputs of an amplifier 146 and an invertor 147 to provide positive and negative frequency adjustment voltages which are combined in summing junctions 141, 148 with the signal from mixer 138 and then fed back to drive combs 116, 117. The signal from the mixer is applied to summing junction 148 through an amplifier 149.

It should be noted that the polarities shown for the frequency adjustment voltages are exemplary only and that in practice they are determined by the polarity of the output of phase/frequency detector circuit 143. They will, however, always be opposite in polarity. One of these two signals will add constructively with the DC voltage applied one of the summing junctions 141, 148, thereby increasing the bias voltage applied across the corresponding drive comb. The other will reduce the bias voltage applied to the other drive comb. This change in the relative magnitude of the dc bias voltages on the two comb-finger structures will tend to reduce the resonance frequency of one of the mass-spring systems and increase the resonance frequency of the other, with increased DC bias voltages resulting in reduced drive frequencies.

When operating in closed-loop fashion, the frequencies of the two uncoupled mass-spring systems are electronically coupled to run at the same frequency and with the correct phase relationship based on the frequency adjustment voltages that are applied to the comb structures.

As noted above, the drive voltage applied to summing junction 141 is also applied to summing junction 148 after passing through amplifier 149. This ensures that the two drive signals are in phase. Once the two mass-systems are tuned electronically to have the same resonance frequency, the masses will have substantially identical responses to this drive voltage, thereby ensuring a balance of drive momentum between the two oscillating masses.

The circuit of FIG. 8 differs from that of FIG. 7 in that the portion of the circuit for each of the two mass-spring systems has its own independent AGC loop 129, 150. Otherwise, the two circuits are substantially similar, and like reference numerals designate corresponding elements in them.

AGC loop 150 is similar to AGC loop 129 in that it includes a full-wave rectifier 151 to which the signal from the bandpass filter 128 in that portion of the circuit is applied. That signal is also applied to a voltage comparator 152 which provides a square wave reference signal VC_2 that is applied to the reference input of rectifier 151.

The rectified signal is combined with a reference voltage at summing junction 153. The signal from that junction is applied to another summing junction 154, the output of which is connected to the input of an integrator 156. The output of the integrator is fed back to the input of the integrator through a phase lead-lag network 157.

The output signal from integrator 156 is modulated back to the resonance frequency of the mass-spring system associated with drive comb 117 and pickup comb 119 by a mixer 158, using the signal from the corresponding bandpass filter 128 as a reference, then applied to drive comb 117 via amplifier 149 and summing junction 148.

The reference signals VC_1 and VC_2 from voltage comparators 132, 152 are applied to the inputs of the phase/frequency detector 143, which functions in the same manner as in the embodiment of FIG. 7. The frequency adjustment voltages are shown as being applied to the drive combs 16, 117, although they could also be applied to separate frequency adjustment electrodes, if desired.

The embodiment of FIG. 9 is almost identical to the embodiment of FIG. 7, and like reference numerals once again designate corresponding elements in the two embodiments. However, in the embodiment FIG. 9, the outputs of amplifiers 139, 149 are applied directly to drive combs 116, 117, rather than being combined with the frequency adjustment voltages from amplifier 146 and invertor 147, and the frequency adjustment voltages (designated Va+ and Va− in this figure) are applied to separate frequency adjustment capacitive elements, e.g., electrodes 43, 44 in FIGS. 3 and 4 and electrodes 107 in FIG. 6, rather than being fed back to the drive combs. Similar electrodes can also be employed in the embodiment of FIG. 5, if desired.

Voltages Va+ and Va− can be added to a common bias voltage (not shown) before being applied to the frequency adjustment electrodes, in which case the total bias voltage applied to one mass system will have a larger absolute value than the total bias voltage applied to the other system. This will result in an adjustment of the relative frequency of the two systems.

The invention has a number of important features and advantages. The drive and/or sense modes of two or more otherwise uncoupled masses are coupled together electronically by the use of an electronic circuit to adjust their resonance frequencies. This makes it possible to ensure that the mass systems will all be operating with identical resonance frequencies, which is not generally possible with mechanical coupling. With a two-mass system operating in a differential mode of displacement, the momentums of the two oscillating masses will tend to cancel, thereby minimizing undesired coupling to the surrounding environment.

Although the invention has been described with specific reference to a micromachined gyroscope, it will be understood that it is equally applicable to other devices in which vibratory masses otherwise uncoupled are coupled together by electronic frequency adjustment. In that regard, it is applicable to gyroscopes in which rotation is sensed about the y-axis as well as to ones in which the sensing is done about the z-axis.

The invention should not be confused with prior art devices in which simply have decoupling between the drive mode and sense mode of the sensor, rather than decoupling between oscillating masses in the drive mode of oscillation. In such prior art devices, mode frequency tuning is used to match the sense mode frequency to the drive mode frequency. That is, a passive sense mode (i.e., one which is not actively driven in oscillation) is matched approximately to an active (driven) mode of oscillation. Electronic coupling differs from such devices in that it involves adjustment of two or more active elements being driven in oscillation to have precise frequency and phase matching.

It is apparent from the foregoing that a new and improved rate sensor and method have been provided. While only certain presently preferred embodiments have been described in detail, as will be apparent to those familiar with the art, certain changes and modifications can be made without departing from the scope of the invention as defined by the following claims.

What is claimed is:

1. A micromachined vibratory gyroscope having drive and sense modes of operation, comprising: a plurality of physically uncoupled masses mounted on a substrate for movement independently of each other along drive and sense axes, and means coupling the masses together electronically in at least one of the modes by applying electrical signals to adjust the resonance frequency of at least one of the masses.

2. The gyroscope of claim 1 wherein the means coupling the masses together electronically includes means for making the resonance frequencies of the masses the same.

3. The gyroscope of claim 1 wherein the means coupling the masses together electronically includes means responsive to motion of the masses along one of the axes for providing a correction signal corresponding to any frequency or phase difference in the motion of the masses, and means for applying the correction signal to at least one of the masses to make the resonance frequencies of the masses the same.

4. The gyroscope of claim 3 wherein the means for applying the correction signal includes means for applying correction signals of opposite polarity to the masses.

5. The gyroscope of claim 1 including a plurality of comb fingers affixed to each of the masses and extending in a direction parallel to the sense axis, additional comb fingers interleaved between the fingers affixed to the masses, and means mounting the additional comb fingers to the substrate in a manner permitting the additional fingers to move in concert with the fingers affixed to the masses along the drive axis but not the sense axis.

6. The gyroscope of claim 5 wherein the means mounting the additional comb fingers to the substrate includes a flexible beam extending along the sense axis.

7. A method of operating a micromachined vibratory gyroscope with drive and sense modes, comprising the steps of: allowing a plurality of physically uncoupled masses to move independently of each other along drive and sense axes, and coupling the masses together electronically in at least one of the modes by using electrical signals to adjust the resonance frequency of at least one of the masses.

8. The method of claim 7 wherein the resonance frequencies of the masses are adjusted to be the same.

9. The method of claim 7 wherein the masses are coupled together electronically by monitoring motion of the masses along one of the axes, providing a correction signal corresponding to any frequency or phase difference in the monitored motion, and applying the correction signal to at least one of the masses to make the resonance frequencies of the masses the same.

10. The method of claim 9 wherein correction signals of opposite polarity are applied to the masses.

11. A micromachined vibratory gyroscope having drive and sense modes of operation, comprising: a plurality of drive masses and sensing masses, means coupling the drive masses and sensing masses together in such manner that the drive masses move independently of the sensing masses along a drive axis and the sensing masses move in concert with the drive masses along a sense axis, and means coupling the masses together electronically in the sense mode by application of electrical signals to adjust the resonance frequencies of at least one of the masses in the sense mode.

12. The gyroscope of claim 11 wherein the means coupling the drive and sensing masses together electronically in the sense mode includes means for making the resonance frequencies of the masses the same in the sense mode.

13. The gyroscope of claim 11 wherein the means coupling the masses together electronically includes means responsive to motion of the drive and sensing masses along the sense axis for providing a correction signal corresponding to any frequency or phase difference in the motion of the masses, and means for applying the correction signal to at least one of the masses to make the resonance frequencies of the masses the same in the sense mode.

14. The gyroscope of claim 13 wherein the means for applying the correction signal includes means for applying correction signals of opposite polarity to the masses.

15. The gyroscope of claim 11 wherein the means coupling the drive masses and sensing masses together comprises a first set of beams which are relatively rigid along the drive axis and relatively flexible along the sense axis connected between the sensing masses and fixed anchors to prevent the sensing masses from moving along the drive axis and allowing the sensing masses to move along the sense axis, and a second set of beams which are relatively flexible along the drive axis and relatively rigid along the sense axis interconnecting the drive masses and the sensing masses.

16. The gyroscope of claim 15 wherein the beams in the first set have middle portions connected to the anchors and end portions connected to the sensing masses, and the beams in the second set have middle portions connected to the drive masses and end portions connected to the sensing masses.

17. The gyroscope of claim 11 including a pair of sensing capacitors associated with each of the sensing masses for detecting movement of the sensing masses along the sense axis, means for subtracting a signal from one of the capacitors associated with each sensing mass from a signal from the other capacitor in the pair to obtain an output signal for the mass, and means for subtracting the output signal for one sensing mass from the output signal for another.

18. A method of operating a micromachined vibratory gyroscope having a plurality of drive masses and sensing masses, with drive and sense modes of operation, comprising the steps of: allowing the drive masses to move independently of the sensing masses along a drive axis, constraining the sensing masses to move in concert with the drive masses along a sense axis, and coupling the masses together electronically in the sense mode by using electrical signals to adjust the resonance frequencies of at least one of the masses in the sense mode.

19. The method of claim 18 wherein the resonance frequencies of the masses are adjusted to be the same in the drive mode.

20. The method of claim 18 wherein the masses are coupled together electronically by monitoring motion of the masses along the sense axis, providing a correction signal corresponding to any frequency or phase difference in the monitored motion, and applying the correction signal to at least one of the masses to make the resonance frequencies of the masses the same in the sense mode.

21. The method of claim 20 wherein correction signals of opposite polarity are applied to the masses.

22. The method of claim 18 including the steps of detecting movement of the sensing masses along the sense axis with a pair of sensing capacitors associated with each of the sensing masses, subtracting a signal from one of the capacitors associated with each sensing mass from a signal from the other capacitor in the pair to obtain an output signal for the mass, and subtracting the output signal for one sensing mass from the output signal for another.

23. A micromachined vibratory gyroscope having drive and sense modes, comprising: a plurality of masses which are uncoupled and free to move independently of each other along a drive axis, a pickoff beam coupling the masses together for movement in opposite directions along a sense axis, means responsive to movement of the pickoff beam for sensing movement of the masses along the sense axis, and means coupling the masses together electronically in the drive mode by application of electrical signals to adjust the resonance frequencies of the masses in the drive mode.

24. The gyroscope of claim 23 wherein the means coupling the masses together electronically includes means for making the resonance frequencies of the masses the same in the drive mode.

25. The gyroscope of claim 23 wherein the means coupling the masses together electronically includes means responsive to motion of the masses along the drive axis for providing a correction signal corresponding to any frequency or phase difference in the motion of the masses, and means for applying the correction signal to at least one of the masses to make the resonance frequencies of the masses the same in the drive mode.

26. The gyroscope of claim 23 wherein the means for applying the correction signal includes means for applying correction signals of opposite polarity to the masses.

27. The gyroscope of claim 23 wherein the pickoff beam is free to rotate about an input axis perpendicular to the drive and sense axes and constrained against translation along the drive and sense axes.

28. The gyroscope of claim 27 wherein the pickoff beam is mounted on a first beam which is flexible along the drive axis and rigid along the sense axis and a second beam which is rigid along the drive axis and flexible along the sense axis.

29. The gyroscope of claim 28 wherein the first beam extends in a direction parallel to the sense axis between a fixed anchor and the pickoff beam, and the second beam extends in a direction parallel to the drive axis between a fixed anchor and the pickoff beam.

30. A method of operating a micromachined vibratory gyroscope having a plurality of masses which are uncoupled and free to move independently of each other along a drive axis and a pickoff beam coupling the masses together for movement in opposite directions along a sense axis, comprising the steps of: monitoring movement of the pickoff beam to sense movement of the masses along the sense axis, and coupling the masses together electronically in a drive mode by applying electrical signals to adjust the resonance frequency of at least one of the masses in the drive mode.

31. The method of claim 30 wherein the resonance frequencies of the masses are adjusted to be the same in the drive mode.

32. The method of claim 30 wherein the masses are coupled together electronically by monitoring motion of the masses along the drive axis, providing a correction signal corresponding to any frequency or phase difference in the monitored motion, and applying the correction signal to at least one of the masses to make the resonance frequencies of the masses the same in the drive mode.

33. The method of claim 32 wherein correction signals of opposite polarity are applied to the masses.

* * * * *